(12) United States Patent
Funabashi et al.

(10) Patent No.: US 8,228,361 B2
(45) Date of Patent: Jul. 24, 2012

(54) INFORMATION PROCESSING DEVICE, INFORMATION PROCESSING METHOD, INFORMATION PROCESSING PROGRAM, AND PORTABLE TERMINAL DEVICE

(75) Inventors: Yoshimitsu Funabashi, Tokyo (JP); Keiko Hiraoka, Tokyo (JP); Mayu Irimajiri, Tokyo (JP); Atsushi Imai, Tokyo (JP); Takamoto Tsuda, Kanagawa (JP); Takeshi Matsuzawa, Kanagawa (JP); Takeshi Tanigawa, Tokyo (JP); Tomoharu Okamoto, Kanagawa (JP); Akihiko Adachi, Tokyo (JP); Tatsuhiko Nishimura, Tokyo (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 1453 days.

(21) Appl. No.: 11/806,547

(22) Filed: Jun. 1, 2007

(65) Prior Publication Data
US 2008/0026736 A1    Jan. 31, 2008

(30) Foreign Application Priority Data
Jun. 7, 2006   (JP) ................................. 2006-158236

(51) Int. Cl.
*H04N 7/14* (2006.01)
*H04M 3/42* (2006.01)
*H04W 4/00* (2009.01)
*H04M 11/00* (2006.01)

(52) U.S. Cl. .................... 348/14.02; 455/415; 455/466; 379/93.21; 379/93.23

(58) Field of Classification Search ........ 348/14.01–14.8; 455/466, 436, 435, 414.1, 556, 550.01, 556.2, 455/550, 415, 456–457; 379/88.19, 202.01, 379/93.21, 93.23, 93.24
See application file for complete search history.

(56) References Cited

U.S. PATENT DOCUMENTS
7,129,969 B2 * 10/2006 Fukuda .................. 348/14.01
(Continued)

FOREIGN PATENT DOCUMENTS
EP    0 436 345 A2    12/1990
(Continued)

OTHER PUBLICATIONS

Extended European Search report issued Oct. 13, 2009 for corresponding European Application No. 08 01 5900.

(Continued)

*Primary Examiner* — Curtis Kuntz
*Assistant Examiner* — Sunita Joshi
(74) *Attorney, Agent, or Firm* — Rader Fishman & Grauer, PLLC (57) ABSTRACT

An information processing device includes a communication unit conducting a videophone call, a memory storing a telephone directory which registers at least each individual telephone number and which is capable of registering a portrait image associated with each individual telephone number, a portrait image registration determination unit determining whether or not a portrait image of a calling party is registered in the telephone directory by referring to the telephone directory based on the telephone number of the calling party when sending and receiving data according to the videophone call, a portrait image capturing unit capturing a portrait image received from the calling party as a calling party portrait image if the portrait image registration determination unit determines that the portrait image of the calling party is not registered in the telephone directory, and a portrait image automatic registration unit registering automatically the portrait image captured in the portrait image capturing unit as the calling party portrait image in the memory.

3 Claims, 7 Drawing Sheets

U.S. PATENT DOCUMENTS

| | | | |
|---|---|---|---|
| 7,308,277 B2 * | 12/2007 | Yomoda | 455/466 |
| 2002/0094806 A1 | 7/2002 | Kamimura | |

FOREIGN PATENT DOCUMENTS

| | | |
|---|---|---|
| EP | 0 741 484 A2 | 11/1996 |
| EP | 1 033 878 A2 | 3/2000 |
| EP | 1 330 124 | 7/2003 |
| EP | 1 501 265 A2 | 1/2005 |
| GB | 2 372 402 | 8/2002 |
| JP | 08-130720 A | 5/1996 |
| JP | 09-163329 A | 6/1997 |
| JP | 09-331385 A | 12/1997 |
| JP | 2002-158981 A | 5/2002 |
| JP | 2005-244815 | 9/2005 |

OTHER PUBLICATIONS

European Search Report; Application No. 07252258.4-1237; Oct. 4, 2007.

Japanese Office Action issued Feb. 3, 2010 for corresponding Japanese Application No. 2006-158236.

* cited by examiner

INFORMATION PROCESSING DEVICE, INFORMATION PROCESSING METHOD, INFORMATION PROCESSING PROGRAM, AND PORTABLE TERMINAL DEVICE

BACKGROUND OF THE INVENTION

1. Field of the Invention

The present invention relates to an information processing device suitable for a portable device, such as mobile telephone, a PHS (Personal Handy phone System) phone, a PDA (Personal Digital Assistant) device provided with a communication function, a notebook-size personal computer, etc., an information processing method for the same, an information processing program for the same, and a portable terminal device provided with the same. More particularly, the present invention relates to an information processing device, an information processing method, an information processing program and a portable terminal devices, which are capable of automatically registering portrait images of each user to the telephone directory.

2. Description of Related Art

Japanese Patent Application Publication No. 2005-244815 (hereinafter referred to as "patent document 1") discloses a portable terminal device which is capable of displaying personal information, such as a telephone number or an e-mail address of each user, and the corresponding portrait image, such as a photograph of an user's face, by putting them into one viewing area. Such a portable terminal device is described in pages 6 and 8 and FIGS. 7 and 14 in the patent document 1.

In the portable terminal device, a telephone directory section registers personal information such as a registration number, a name of an individual or a company, a telephone number, an e-mail address, a group name, an address, a birthday, a memorial day, or the like. A photo registration section registers a portrait image, such as a user's face photograph which corresponds to the registration number by referring to the registration number of the telephone directory. A display section displays a user's personal information together with the user's portrait image associated with the personal information and registered, which are put into one screen. The user's personal information and the user's portrait image are read from the telephone directory and the photo registration section, respectively.

Thus, to communicate by telephone or e-mail or the like, a user can be easy to identify due to sorting by the user's face photograph together with the personal information of the user.

SUMMARY OF THE INVENTION

However, in the portable terminal device disclosed in patent document 1, registration of a portrait image that is to be displayed is required in advance by manually registering it to the photo registration section so as to display a portrait image of a user's face photograph or the like. This registration operation of the portrait image is very burdensome because an operation for each user is needed. Thus, a display function of displaying a portrait image together with personal information registered in a telephone directory is not utilized due to such a burdensome operation.

Accordingly, it is desirable to provide an improved information processing device, an information processing method, an information processing program, and a portable terminal device, in which the corresponding user's portrait image can be automatically registered to each user's registration section in the telephone directory, thereby reducing a burdensome registration operation of the portrait image to be registered. The present invention is made in view of the above.

In accordance with a first aspect of the present invention, there is provided an information processing device including: a communication unit conducting a videophone call by sending and receiving sound and image data; a memory storing a telephone directory which registers at least each individual telephone number and is capable of registering a portrait image associated with the individual telephone number; a portrait image registration determination unit determining whether or not a portrait image of a calling party is registered in the telephone directory by referring to the telephone directory based on a telephone number of a calling party when outgoing or incoming of a call by the videophone function: a portrait image capturing unit capturing a portrait image received from a calling party as a calling party portrait image if the portrait image registration determination unit determines that the portrait image of the calling party is not registered in the telephone directory; and a portrait image automatic registration unit automatically registering in the memory the portrait image captured by the portrait image capturing unit as the calling party portrait image.

In accordance with a second aspect of the present invention, there is provided a method of information processing, comprising the steps of: determining, by a portrait image registration determination unit, whether or not a portrait image of calling party is registered by referring to a telephone directory based on a telephone number of a calling party at the incoming or outgoing of a videophone call to communicate by sending and receiving sound and image date, the telephone directory registering at least the telephone number of each user and a portrait image associated with each user's telephone number; capturing, by a portrait image capturing unit, an image received from the calling party as a portrait image of the calling party if it is determined that the portrait image of the calling party is not registered in the determining step; and registering, by a portrait image registration unit, the portrait image captured in the capturing step to the telephone directory automatically as the calling party's portrait image.

In accordance with a third aspect of the present invention, there is provided a computer program product containing computer-readable instructions including: instruction means for causing a computer to function as a determination section which determines whether or not a portrait image of a calling party is registered by referring to a telephone directory at the incoming or outgoing of a videophone call to communicate by sending and receiving sound and image data, the telephone directory registering at least the telephone number of each user and a portrait image associated with the each user's telephone number; instruction means for causing a computer to function as a capturing section which captures an image received from a calling party as a portrait image of the calling party if it is determined that the portrait image of the calling party is not registered when the computer functions as the determination section; and instruction means for causing a computer functioning as a capturing section to function as a registration section which registers the portrait image to the telephone directory automatically as the calling party's portrait image, the portrait image being captured when the computer functions as the capturing section.

In accordance with a fourth aspect of the present invention, there is provided a portable communication device including: a communication unit conducting a videophone call by sending and receiving sound and image data; a detecting unit detecting an incoming and outgoing of the videophone call; a memory storing a telephone directory which registers at least a telephone number of each user, and being capable of registering a portrait image associated with each telephone number; a portrait image registration determination unit determining whether or not a portrait image of calling party is registered in the telephone directory by referring to the telephone directory based on a telephone number of the calling party when the detecting unit detects the incoming or outgoing of the videophone call; a portrait image capturing unit capturing an image received from the calling party through the communication unit if the portrait image registration determination unit determines that the a portrait image of the calling party is not registered; and a portrait image automatic registration unit automatically registering in the telephone directory the portrait image captured by the portrait image capturing unit as a portrait image of the calling party which the portrait image is not registered.

Accordingly, the present invention realizes the automatic registration of a portrait image by storing a portrait image of calling party received from the calling party at the time of a videophone call.

According to the present invention, a portrait image together with personal information, such as a telephone number, can be registered automatically as a calling party's portrait image to a memory, thereby reducing a burdensome registration operation of the portrait image.

These and other features and aspects of the invention are set forth in detail below with reference to the accompanying drawings in the following detailed description of the embodiments.

DETAILED DESCRIPTION

The present invention may be applied to a mobile telephone.

[Electric Configuration of Mobile Telephone]

Figure 1:
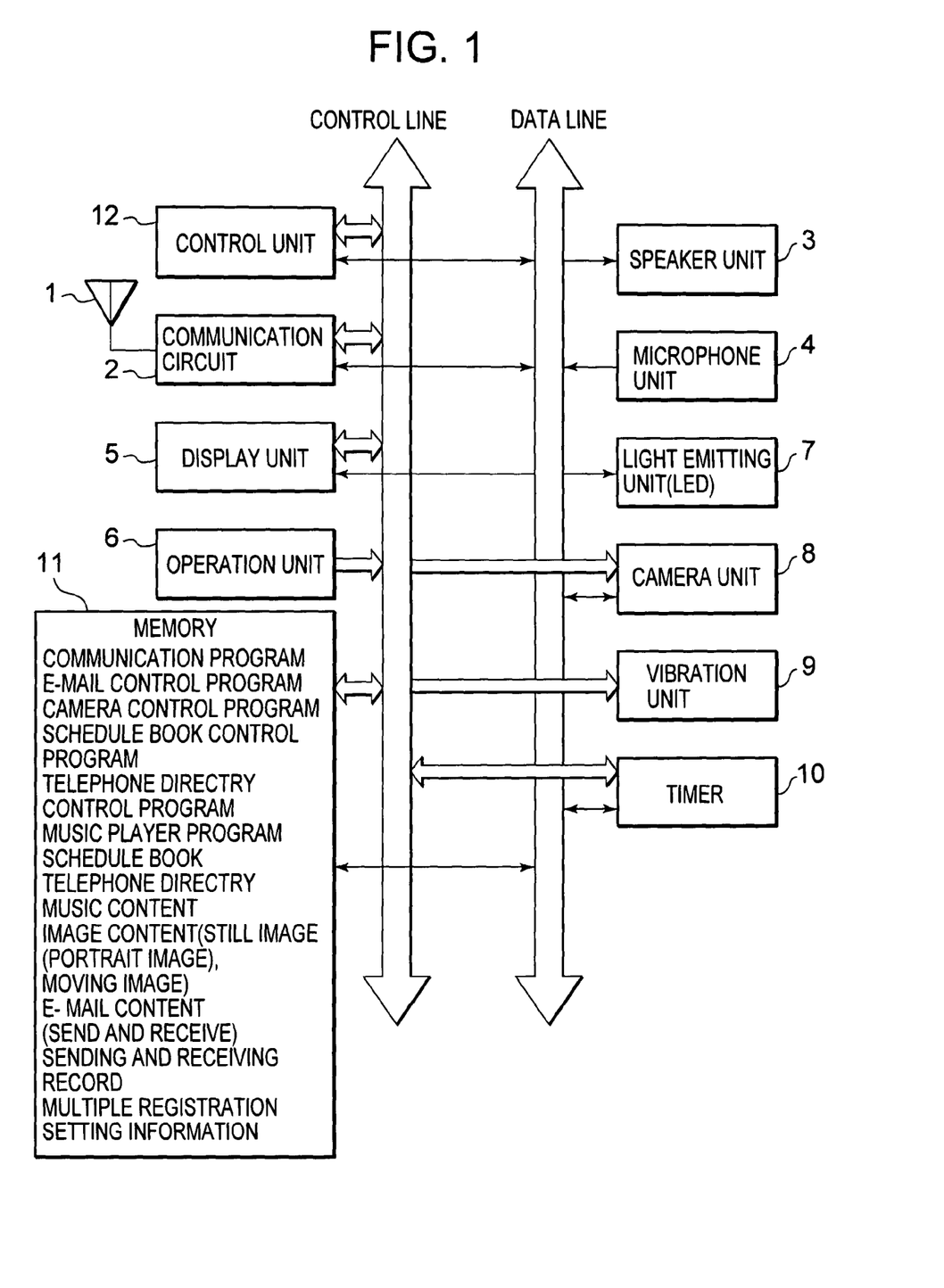
FIG. 1 shows a block diagram showing a mobile telephone according to an embodiment of the present invention.

A mobile telephone 20 which is an embodiment of the present invention includes an antenna 1, a communication circuit 2, a speaker unit 3 for sound output, such as ringer tone or a receiving voice, a microphone unit 4 for collecting outgoing voice or sound, and a display unit 5 for displaying an image (moving image or still image or the like). The antenna 1 is used for wireless communication with a base station as shown in FIG. 1.

The mobile telephone 20 further includes an operation unit 20 for performing operations such as an input operation of characters, etc., or a selection operation of a desired menu or the like, a light emitting unit 7 (LED: Light Emitting Diode) for notifying an incoming and/or outgoing call, etc. by means of light, a camera section 8 for shooting a still image or a moving image of a desired subject, and a vibration unit 9 for notifying an incoming and/or outgoing (incoming/outgoing) call, etc. by means of vibration of a housing of the mobile telephone 20.

The mobile telephone 29 further includes a timer 10 which counts a present time, a memory 11 which stores a communication processing program (communication program), etc. for making a videophone call in addition to a telephone call, and a control unit 12 for controlling the entire part of the mobile telephone 20. A telephone call is made by sending and receiving sound and moving image data.

The memory 11 stores various kinds of application programs, such as an e-mail control program for controlling, producing and sending and/or receiving (sending/receiving) of an e-mail, a camera control program for controlling image shooting of the camera section 8 or for having a viewer function of a moving image or a still image that is shot by the camera section 8 or is captured through a network or an input terminal, a schedule book control program for controlling the schedule book which registers a user's schedule, a telephone directory control program for controlling the telephone directory, and a music player program for playing music content or the like.

The memory 11 also stores a schedule book registering an user's schedule, a telephone directory registering a still image (a portrait image, such as a face photograph or the like) of a user's acquaintance or friend, etc., a telephone number, an e-mail address, a birthday or the like, a music content which is played in response to the music player program, a still image and a moving image which are reproduced in response to the viewer function of the camera control program, and e-mails which are sent/received, and an incoming/outgoing history of telephone calls, videophone calls, and e-mails.

[An Automatic Registration Operation of a Portrait Image into the Telephone Directory]

The mobile telephone 20 is capable of automatically registering portrait images or the like of each user registered in the telephone directory of the memory 11.

[An Automatic Registration Operation of a Portrait Image in a Videophone Call Communication]

Figure 2:
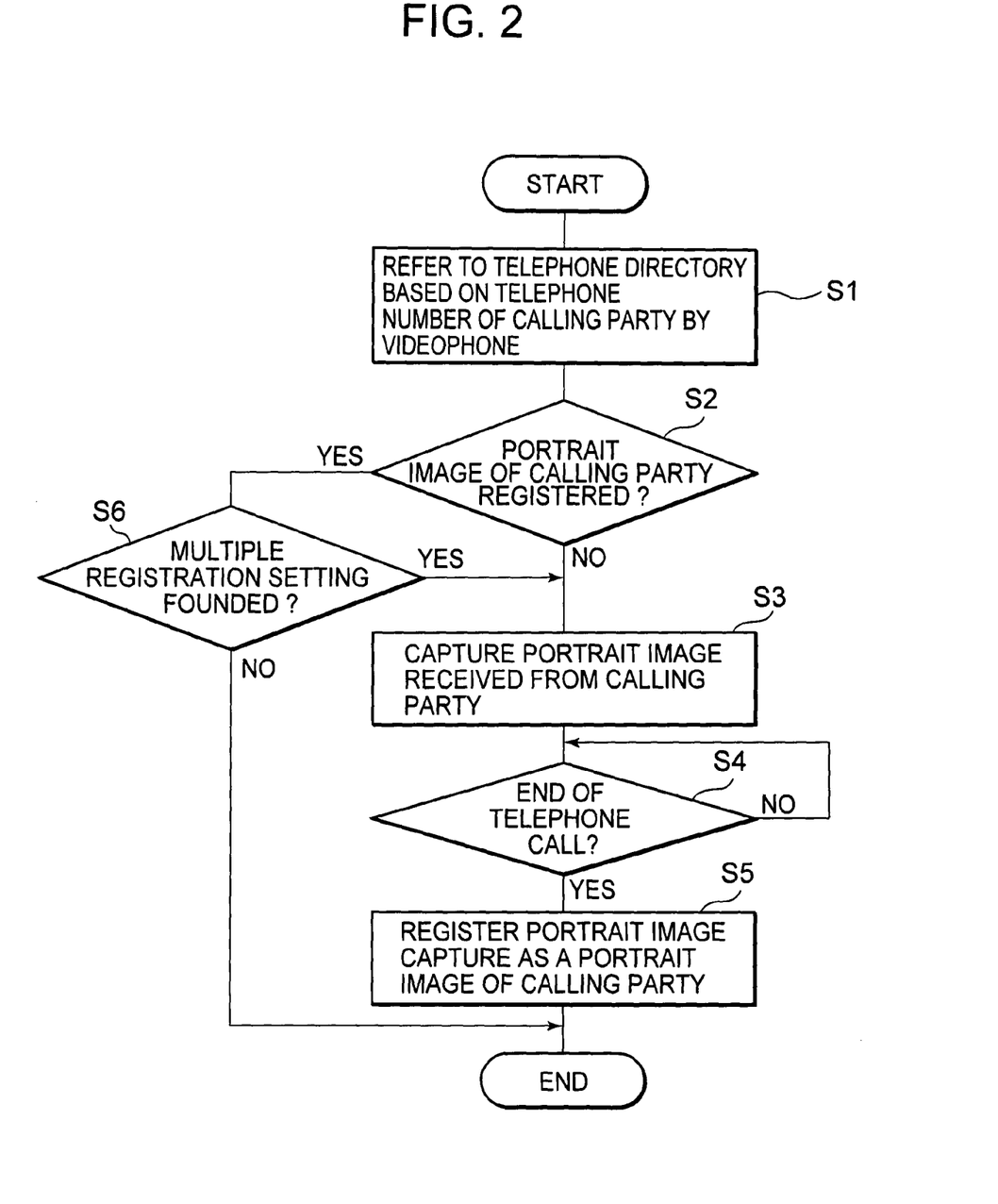
FIG. 2 shows a flow chart illustrating the process of an automatic registration operation during a videophone call of a mobile telephone according to an embodiment.

The mobile telephone 20 is configured to capture a portrait image received from a mobile telephone of a calling party during the videophone call communication, and then to register automatically the portrait image as the corresponding user's portrait image. A flow chart of FIG. 2 shows a flow of the automatic registration process. The control unit 12 starts the process shown in the flow chart of FIG. 2 in response to the telephone directory control program stored in the memory 11 if an incoming/outgoing videophone call is detected.

In step S1, the control unit refers to the telephone directory stored in the memory 11 based on the telephone number of a calling party of the videophone call sent/received. Thereafter, in step S2, it is determined whether or not the calling party's portrait image is registered.

Figure 3A:
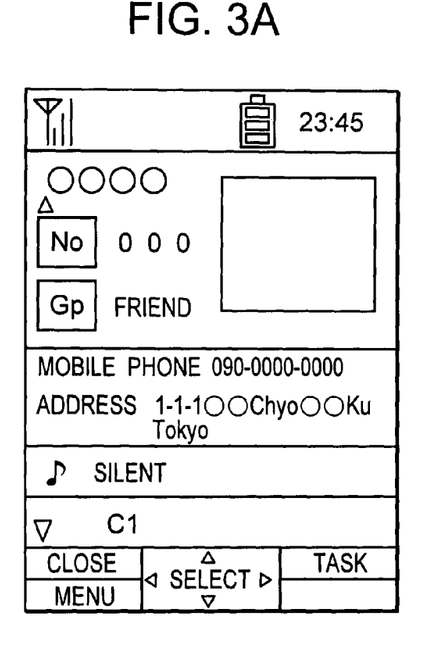
FIGS. 3A-3C shows a display example of a portrait image registered automatically during videophone call according to an embodiment of the mobile telephone, respectively.

FIG. 3A illustrates a display example of personal information of each user registered in the telephone directory. As shown in FIG. 3A, in the case of the mobile telephone in accordance with the present embodiment, the telephone directory is capable of registering personal information, for example, as follows;

(i) name (X X X X is a name in the drawing);
(ii) portrait image (a display region shown by a blank rectangle in the drawing is a display region for portrait image);
(iii) registration number (000 in the drawing is a registration number. The number is assigned automatically to the user inputted in the order of input by the control unit 12 such as 001, 002, 003, etc.);
(iv) group (the term "friend" in the drawing shows a group of friends.);
(v) telephone number;
(vi) e-mail address;
(vii) address; and
(viii) ringer tone or the like.

When the portrait image is not registered, the display region of a portrait image displays for indicating it, for example, a gray display or a blank display, etc. FIG. 3A is a display example when the portrait image is not registered.

When it is determined that the calling party's portrait image is not registered in step S2, the control unit 12 proceeds to step S3. In contrast, when it is determined that the calling party's portrait image is registered, the control unit 12 proceeds to step S6.

In the embodiment of the mobile telephone, a plurality of portrait images can be registered for each of the users registered in the telephone directory. Such a multiple registration of portrait images can be set independently for each user. A multiple registration setting information, which indicates whether or not multiple registrations are present, is linked with each user's personal information registered in the telephone directory and is stored in the memory 11 as shown in FIG. 1.

Accordingly, if the process proceeds to step 6 after determining that the calling party's portrait image has been registered in the step 2, the control unit 12 reads out the multiple registrations setting information associated with personal information of the calling party in order to determine whether or not a further registration of a portrait image can be registered. On the basis of the multiple registration setting information read out, it determines whether or not a multiple registration setting of a portrait image to the calling party is done.

If it determines that the multiple registration setting is done, the control unit 12 proceeds to step S3. If it determines that the multiple registration setting is not done, the control unit 12 ends the entire process illustrated in the flow chart of FIG. 2 at this step because the calling party's portrait image already has been registered, and a multiple registration setting is not done.

On the other hand, if the process proceeds to step S3 after determining that the portrait image of the calling party is not registered in step S2, or the multiple registration setting is done in step S6, the control unit 12 extracts still images for one frame, which forms a moving image, received from the mobile telephone of the calling party who is in the videophone calling, and the process proceeds to step S4.

When a videophone call communication is conducted, a calling party's portrait image shot by a camera unit provided in a mobile telephone of the calling party is received. At just after the beginning of a communication, there is a high possibility that a portrait image shot may be one with an unstable image shot position in the calling party's mobile telephone side.

For this reason, when the portrait image is captured from a moving image received from the calling party's mobile telephone in step S3, the control unit 12 counts a time, e.g., ten seconds, from the starting time based on the measured time information from the timer 10, and then a still image for one frame is captured at the time when ten seconds pass. Thus, the possibility of capturing the portrait image that is shot with the stable image shot position in the side of the calling party can become higher.

Next, in step S4, the control unit 12 determines whether or not the videophone call communication ends by detecting a communication state of the communication circuit 2. The process proceed to step S5 upon detecting the end of the communication, and the portrait image captured in the step S4 is stored in the memory 11 by associating with the calling party's personal information registered in the telephone directory. Accordingly, the entire process illustrated in FIG. 2 ends.

Thus, the portrait image of a user who is a calling party of the videophone call can be registered automatically. The control unit 12 controls to display a portrait image in the display unit 5 when displaying the personal information in the registration section of the telephone directory, the incoming/outgoing of a telephone/videophone call, or the sending/receiving of an e-mail or the like. The portrait image is stored in the memory 11 by being associated with the personal information of the telephone directory.

Figure 3B:
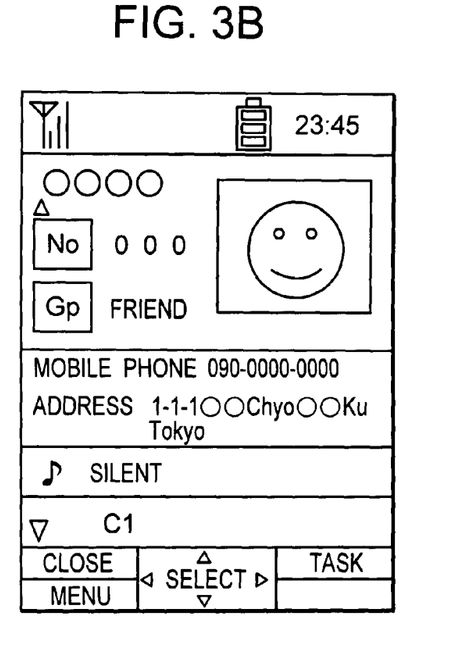

FIG. 3B is a display example when the personal information of a user's registered portrait image is displayed by being read from the telephone directory. As shown in FIG. 3B, once the portrait image is registered, the corresponding user's portrait image captured in the videophone call communication is displayed.

Figure 3C:
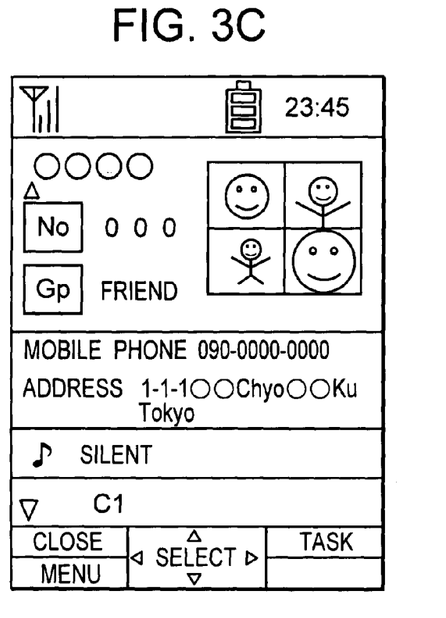

Further, when the multiple registration setting is set to the user, the user's portrait image captured in the videophone call communication together with the portrait image previously registered are displayed in the portrait imaged display region, as shown in FIG. 3C. The display example of FIG. 3C shows the portrait image display region divided into four, and displays the respective portrait images in each of the divided regions. In addition to this, any display method may be employed as long as the multiple portrait images can be displayed in one screen. For example, the display may be done by providing a plurality of display regions each of which is an ordinary size, as shown in FIG. 3A, and displaying the respective portrait images in each display region.

[Automatic Registration Operation of a Portrait Image in Response to E-Mail Received]

Next, when a still image file is attached to the e-mail received, the mobile telephone according to the present embodiment extracts a portrait image from the still image and automatically registers the portrait image as a user's portrait image of the e-mail sender. The mobile telephone also automatically registers "a title" of the e-mail received or text data composed of a predetermined number of characters described in a "body of message" of the e-mail received as a user's portrait image of the e-mail sender.

Figure 4:
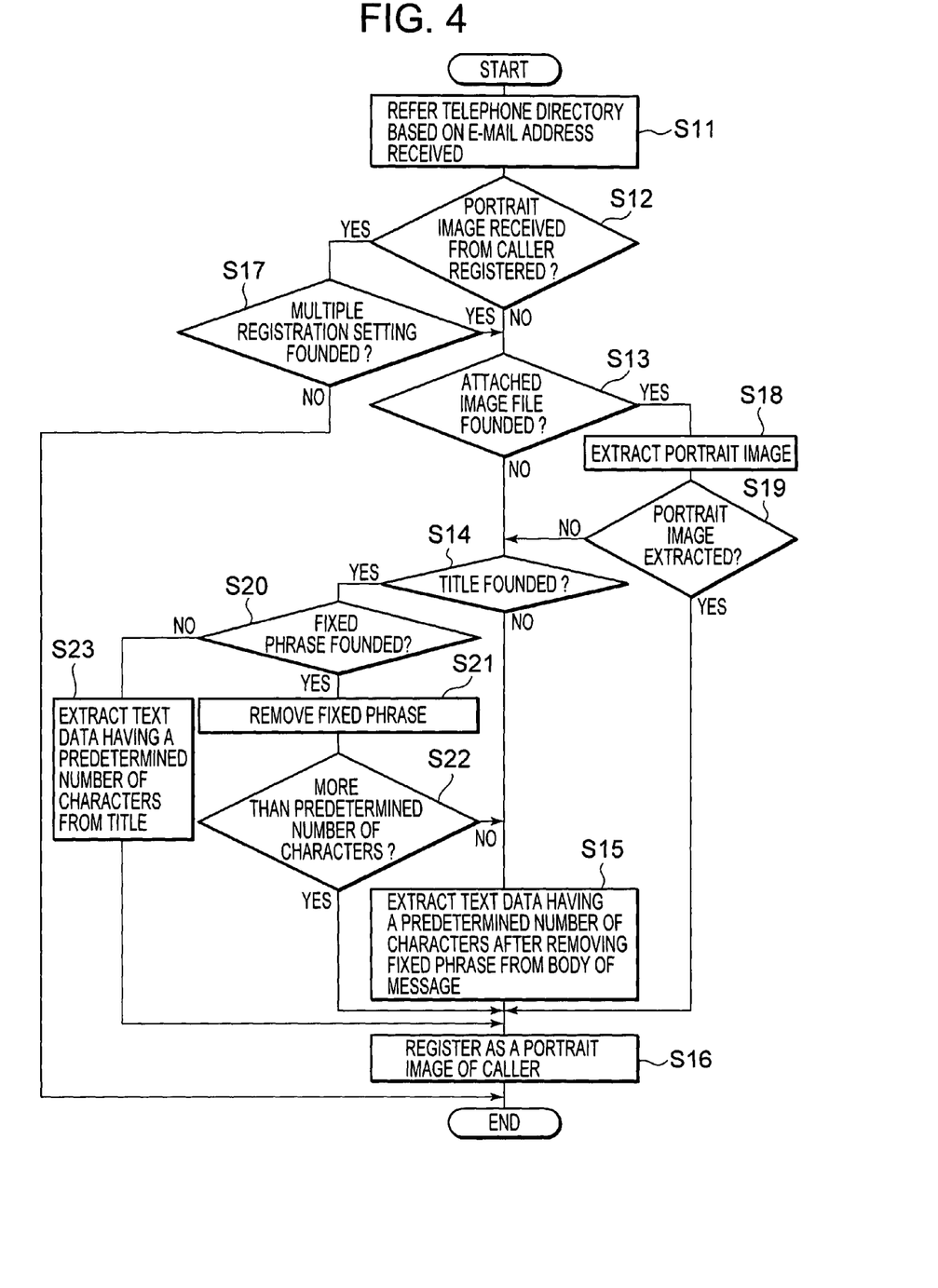
FIG. 4 shows a flow chart illustrating the process of an automatic registration operation at the time of receiving e-mail of an embodiment of the mobile telephone.

FIG. 4 shows a flow chart illustrating a flow of the automatic registration operation. When the control unit 12 detects a reception of an e-mail, a process shown in FIG. 4 starts in response to the telephone directory control program stored in the memory 11.

In step S11, the control unit 12 refers to the telephone directory stored in the memory 11 based on the e-mail address of the received e-mail. In step S12, it determines whether or not a portrait image of the user who is a sender of the e-mail is registered.

In step S12, when it determines that the portrait image of the sender is not registered, the control unit 12 proceeds to the step S13. When it determines that the portrait image of the sender is registered, the control unit 12 proceeds to step S17, and further determines whether or not the multiple registration setting is set. When the multiple registration setting is set, the process proceeds to step S13, and when the multiple registration setting is not set, the entire steps shown in the flow chart of FIG. 4 end.

Next, in step S13, the control unit 12 determines whether or not a still image file is attached to the received e-mail since the user's portrait image of the e-mail sender is not registered or the multiple registration setting to the e-mail sender is not allowed. When it determines that the file is not attached, the control unit 12 proceeds to step S14. When it determines that the file is attached, the control unit 12 proceeds to step S18.

Next, the still image of the attached file is not always a portrait still image. For this reason, the control unit 12 tries an extraction of the portrait image from the still image by using a face recognition technique when the step proceeds to step S18 after the detection of an attached file including a still image. In step S19, it determines whether or not a portrait image from the still image is extracted. When the portrait image is not extracted, the step proceeds to step S14. When it determines that the portrait image is extracted, the step proceeds to step S16.

When the process proceeds to step S16, the control unit 12 automatically registers the portrait image extracted from the attached file as an user's portrait image of the e-mail sender by associating with the user's personal information registered in the telephone directory.

Figure 5A:
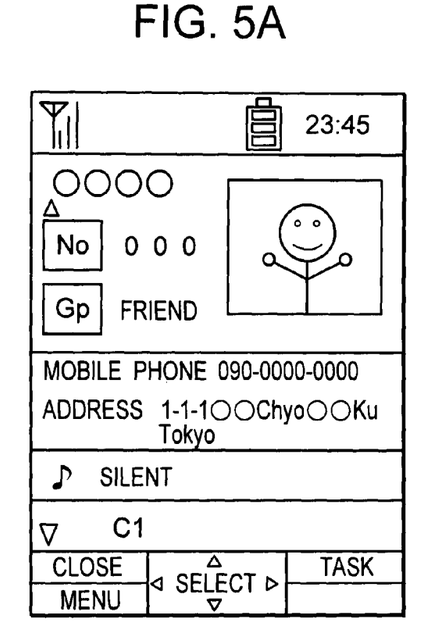
FIGS. 5A-5D show a display example of portrait image registered automatically at the time of receiving e-mail of an embodiment of the mobile telephone, respectively.

As described above, the control unit 12 controls for displaying the portrait image registered in the memory 11 by associating with the personal information stored in the telephone directory when displaying the personal information of the registration section, the incoming/outgoing of a telephone call or videophone call, or the sending/receiving of an e-mail. Thus, for example, if the registration column of the personal information of the e-mail sender is displayed as shown in FIG. 5A, the corresponding user's portrait image extracted from the attached file is displayed.

On the other hand, when the process proceeds to step S14 without detecting the attached image file, or the process proceeds to the step S14 without extracting a portrait image of the attached image file, the control unit 12 determines whether or not a title is given to the received e-mail. If the title is not given to the received e-mail, the process proceeds to step S15. If the title is given to the received e-mail, the process proceeds to step S20.

When the process proceeds to step S20 by detecting the title, the control unit 12 detects whether or not there is a fixed phrase, such as "Re:", "Hello", "How are you ?", "How do you do ?". If such a phrase is detected, the process proceeds to step S21. If such a phrase is not detected, the process proceeds to step S23.

Namely, the mobile telephone of the present embodiment registers automatically the phrase of the title in the e-mail, or the body of the message in the e-mail in place of a portrait image of a user of which the portrait image is not registered. In this case, it is preferable that a characteristic sentence is extracted and then registered in place of the portrait image.

When the control unit 12 proceeds to step S21 after detecting the fixed phrase in the title, the process proceeds to step S22 after the removing the fixed phrase from the phrase in the title. However, if the title is a phrase such as "Hello", the message is not constituted when a fixed phrase is removed from the title. Therefore, the control unit 12 determines whether or not the number of characters in the state of removal of fixed phrases is a predetermined number of characters, e.g., ten characters. If the number of characters of the title is below the predetermined number, the process of registering the title as the portrait image halts and then proceeds to step S15 since there is a little meaning even if only the title composed of below the predetermined number of characters at the result of removing fixed phrases is displayed.

If the title after removing the fixed phrases has a predetermined number of characters or more, the control unit 12 proceeds to step S16. The text data of the title from which the fixed phrases is removed is automatically registered in the memory 11 as the portrait image of the e-mail sender in place of the e-mail sender's portrait image by being associated with the corresponding user's personal information registered in the telephone directory.

On the other hand, in step S20, when the process proceeds to step 23 with no detecting of the fixed phrase from the title, the control unit 12 extracts text data having a predetermined number of characteristics, e.g., ten characters, from the title and then proceeds to the step S16. The text data extracted from the title is automatically registered as a portrait image of the e-mail sender by being associated with the corresponding user's personal information registered in the telephone directory to the memory 11.

Thus, when it is displayed that the registration section of the personal information of a user who is the e-mail sender from the telephone directory, for example, the text data extracted from the title are displayed in the place of the corresponding user's portrait image.

Figure 5B:
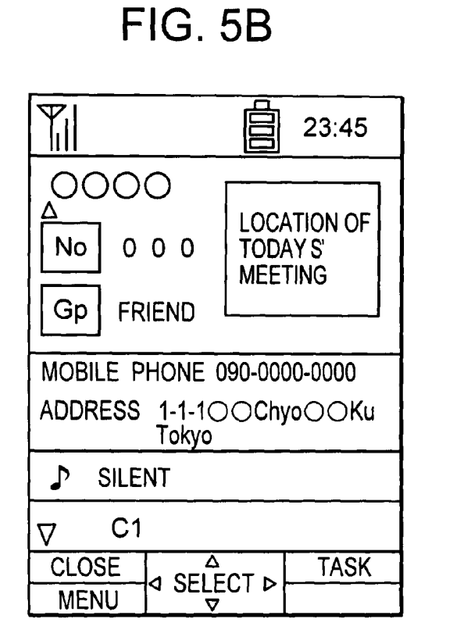

The display shown in FIG. 5B is an example when the title of the e-mail received was "This is a today's meeting place". In this case, this title is displayed as it is in place of the corresponding user's portrait image (See step S23).

The display shown in FIG. 5B is an example when the title of the e-mail received was "Hello. This is a today's meeting place". In this case, the remaining text data of "This is a today's meeting place" is displayed in place of the corresponding user's portrait image by removing the fixed phrase of "Hello" from the title (See step S21).

Next, in step S14, when the title is not given in an e-mail received, the process proceeds to step S15, and then the control unit 12 extracts text data having a predetermined number of characters, e.g., sixteen characters, by removing the above fixed phrase and then the process proceeds to the step S16. In step S16, the text data extracted from the body of the message is automatically registered as the portrait image of the e-mail sender by being associated with the user's personal information registered in the telephone directory.

Figure 5C:
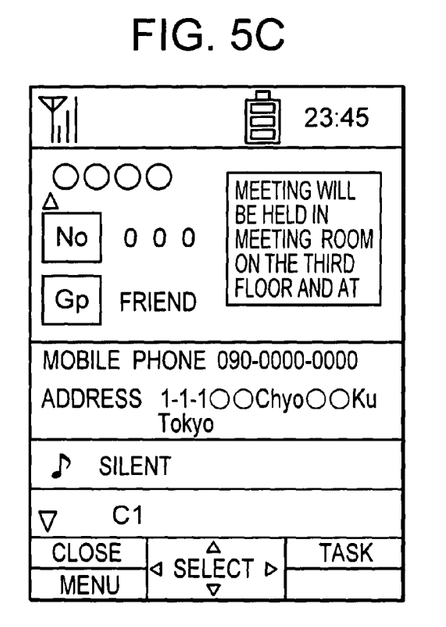

Thus, when the registration section of the personal information of the user who is an e-mail sender from the telephone directory is displayed, the text data extracted from the body of the message is displayed in the display region of the portrait image as shown in FIG. 5C in place of the corresponding user's portrait image.

The display as show in FIG. 5C is an example when the body of the message of the e-mail received is displayed, such as text data of sixteen characters "The meeting will be held in the meeting room on the third floor and at", by removing the fixed phrases "Hello" and "How are you?" from the body of message "Hello, The meeting will be held in the meeting room on third floor and at 10:00—" in the e-mail received.

Figure 5D:
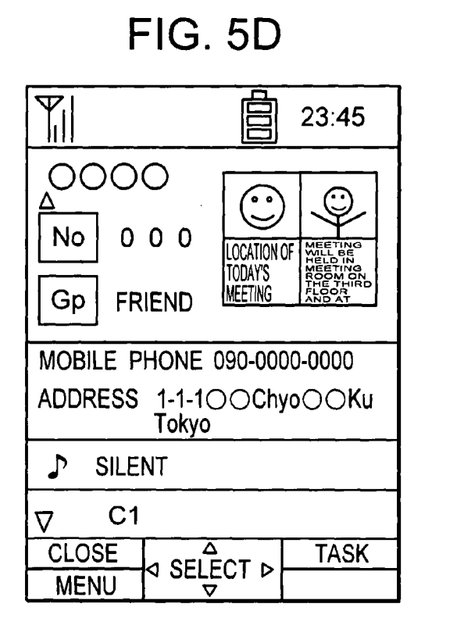

When the multiple registration setting is set to the user, text data extracted from the title or the body of the message is displayed in the portrait image display region together with the portrait image previously registered, as shown in FIG. 5D.

[Automatic Registration Operation Based on the Calling Record and the Sent/Received E-mail]

Figure 6:
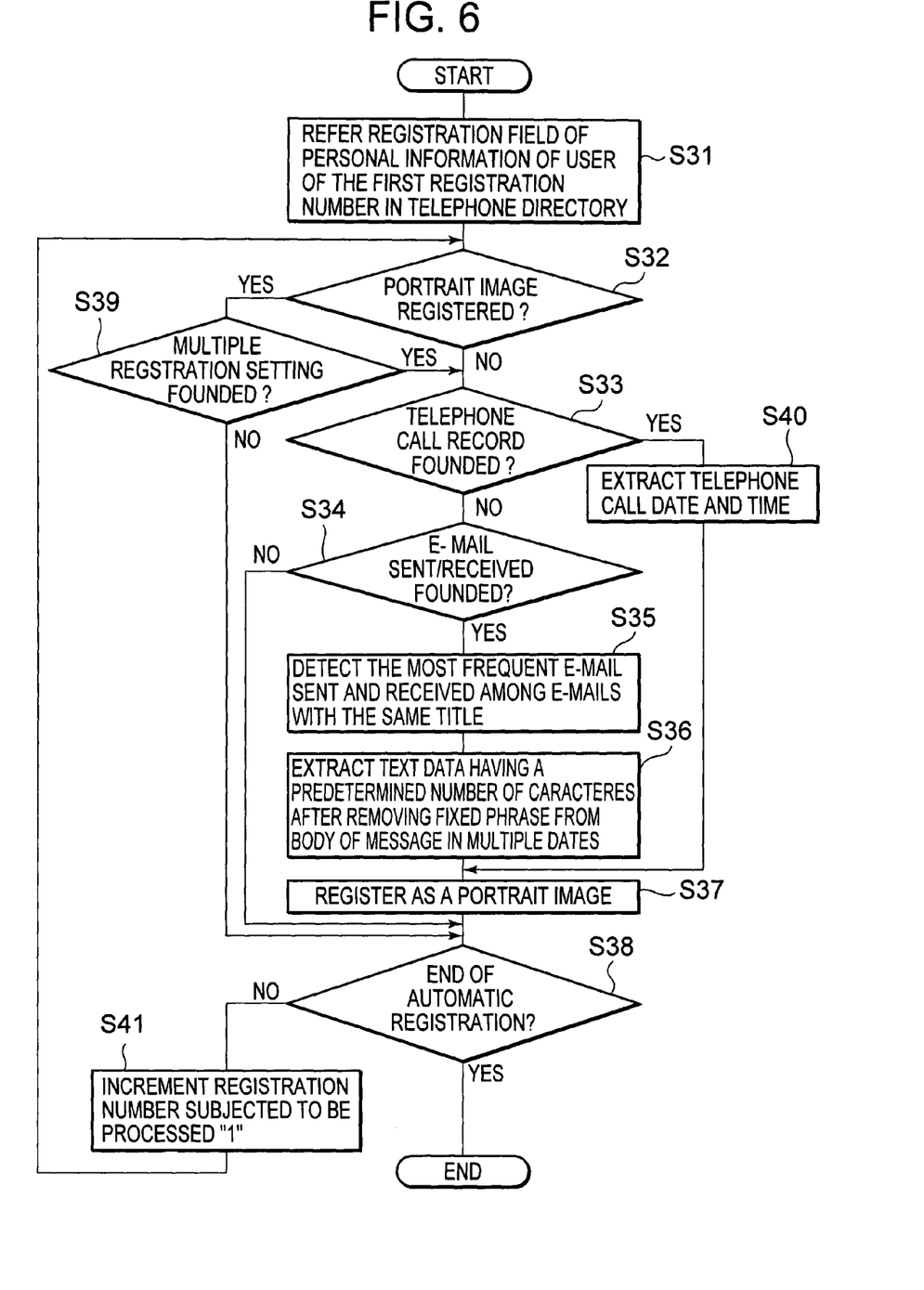
FIG. 6 shows a flow chart illustrating the process of an automatic registration operation in charging the mobile telephone according to an embodiment or at a specific time.

Next, the embodiment of the mobile telephone is configured to register automatically a portrait image based on the calling record or the e-mail sent/received. The flow chart of FIG. 6 shows a flow of automatic registration operations. The control unit 12 detects, for example, that the time is a predetermined time, such as 12:00 p.m., or 0:00 a.m., or is in the time of battery-charging of the mobile telephone, and the process of flow illustrated in FIG. 6 is started.

In step S31, the control unit 12 proceeds to step S32 after referring to the registration field of personal information of user who has a first registration number in the telephone directory. In step S32, it determines whether or not the portrait image of the user who has the first registration number is registered.

Namely, in the case of the embodiment of the mobile telephone, when the personal information is inputted to the first registration number of the telephone directory, the control unit 12 gives a registration number, such as 000, 001, 002, etc, automatically. For this, the control unit 12 refers to the personal information of the user whose registration number is "000" in the step S31, and then it determines whether or not the portrait image of the user whose registration number is "000' is registered in step S32.

Next, when the control unit 12 determines that the user's portrait image of the first registration number is not registered, the process proceeds to step S33. When the control unit 12 determines that the user's portrait image of the first registration number is registered, the process proceeds to step S39 to determine the availability of the multiple registration setting. When the multiple registration setting is set, the process proceeds to step S33. When the multiple registration setting is not set, the process proceeds to step S38.

In step S33, the control unit 12 determines whether or not there is the corresponding calling record of the user who has the first registration number based on the sending/receiving record stored in the memory 1. If there is no record, the process proceeds to step S34. If there is a record, the process proceeds to step S40.

When the process proceeds to step S40 after the detecting of the calling record, the control unit 12 detects the latest calling record from the corresponding calling record of the user who has the first registration number. The process proceeds to step S37 after extracting the calling date and time from the latest calling record, and then the latest calling date and time are registered as a portrait image of the user who has the first registration number.

Figure 7A:
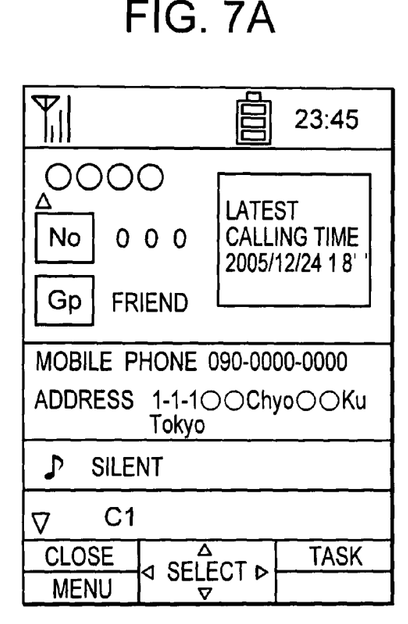
FIG. 7 shows a display example of a portrait image registered automatically in charging the mobile telephone according to an embodiment or at a specific time.

Thus, for example, when the registration section of the personal information of the user who has the first registration number from the telephone directory is displayed, the text data indicating the latest calling date and time extracted from the calling record is displayed in the display region of the portrait image in place of the corresponding user's portrait image. The example shown in FIG. 7A is a display when the latest calling time and date of the corresponding user is "Dec. 24, 2005" and the calling time is "one minute and eighteen seconds".

Next, if the calling record of the corresponding user of the first registration number is not detected, the process proceeds to step S34, and the control unit 12 detects an e-mail corresponding to the user who has the first registration number from e-mails sent/received and stored in the memory 11. If the calling record is detected, the process proceeds to step S38.

Next, when the process proceeds to step S35 after detecting the e-mail which corresponds to the user of the first registration number, the control unit 12 counts the number of the sent/received e-mail which has the same title among the sent/received e-mails stored in the memory 11. A group which includes the largest number of e-mails sent/received among a plurality of groups of e-mails each of which has the same title is detected, and then the process proceeds to step S36.

In detail, for example, when there are five e-mails each of which has the title of "about today's lunch (breakfast/dinner)" among the e-mails corresponding to the user who has the first registration number stored in the memory 11, and there are three e-mails which have the title of "Location of today's meeting", the control unit 12 detects the five e-mails each of which has the title of "about today's lunch(breakfast/dinner)". In the case of detecting such e-mails having the same title, the control unit 12 detects the e-mails after removing the fixed phrase "Re:", which is automatically added frequently to the title when replying to e-mail.

Next, the control unit 12 detects the latest e-mail among the e-mails detected in step S36, the text data having a predetermined number of characters, e.g., sixteen characters, from the body of the message or the title of the latest e-mail after removing the above fixed phrase.

Figure 7B:
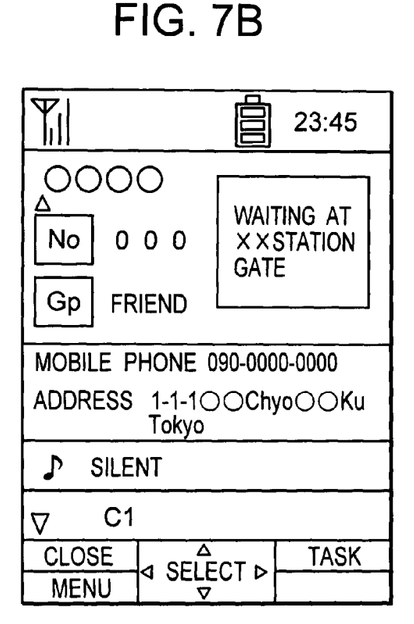

In step 37, the control unit 12 registers automatically in the memory 11 the text data extracted from the body of the message in the e-mail which has the latest date and time as a portrait image of the user having the first registration number. Thus, for example, when the registration section of the personal information of the user having the first registration number is displayed, the text data extracted from the body of the message in the e-mail of the latest date and time is displayed in place of the corresponding user's portrait image as shown in FIG. 7B. The example shown in FIG. 7B is a display of when the text data of "I am waiting at X X station gate" from is the latest e-mail of the corresponding user.

Figure 7C:
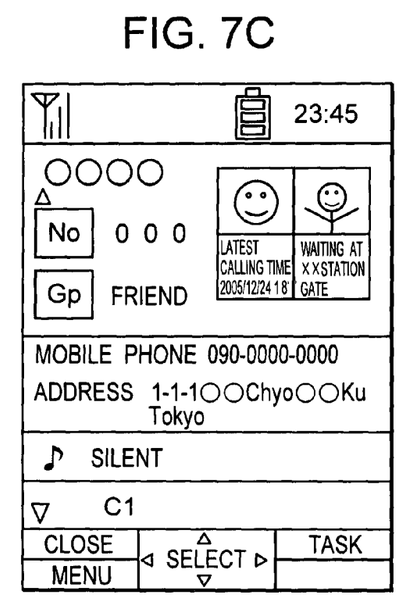

When the multiple registration setting is set to the user who has the first registration number, the text data indicating the latest calling date and time, or the text data extracted from the body of message in the e-mail having the latest date and time together with the portrait image previously registered, are displayed side-by-side in the display region of the portrait image as shown in FIG. 7C.

Next, in step 38, the control unit 12 determines whether or not the automatic registration process for such portrait image of which the whole users are registered in the telephone directory has ended. If it determines that the automatic registration process to the whole users has ended, the whole process illustrated in FIG. 6 ends. If it determines that the automatic registration for all users did not end, the process proceeds to step S41. The process returns to step S32 after incrementing the user's registration number to be subjected to the corresponding portrait image "1". Thus, the subject of the automatic registration of the corresponding portrait image to be processed is shifted to the user whose registration number is "001" from the user whose registration number is "000". When the automatic registration process for the whole user registered in the telephone directory ends, i.e., it determines "Yes" in the step S38, the whole steps illustrated in the flow chart shown in FIG. 6 ends.

[Display Switching Operation of Portrait Image Registered in Multiple Portrait Images]

Next, in an embodiment of the mobile telephone, when displaying the portrait image, registered multiple portrait images are switched for display with a predetermined time period if the multiple portrait images are registered.

Specifically, at the time of displaying the registration section of the personal information in the telephone directory, the control unit 12 determines whether or not multiple portrait images of the user to be displayed are registered by sorting the memory based on the user's personal information. If the multiple portrait images are registered, the control unit 12 controls the display region of the portrait image to switch and display the multiple portrait images registered at the time interval of three seconds while displaying the corresponding user's personal information.

In the incoming/outgoing telephone call or videophone call, the control unit 12 determines whether or not multiple portrait images of an user are registered by sorting the memory 11 based on the user's telephone number sent/received. If the multiple portrait images are registered, the control unit controls to switch and display the registered portrait images by a time interval of, for example, three seconds during a call-out process of a telephone or videophone to the user.

Further, in e-mail sending/receiving, the control unit 12 determines whether or not an user's multiple portrait images are registered by sorting the memory based on the user's e-mail address sent/received. If the multiple portrait images are registered, the control unit 12 controls the display region of the portrait image to switch and display the multiple portrait images registered by a time interval of three second for twelve seconds starting from when the user's e-mail is sent/received.

Thus, if multiple portrait images are registered, all of the user's portrait images registered may be displayed at the time of displaying the registration section of personal information in the telephone directory, or at the time of sending/receiving a telephone call, a videophone call, or an incoming/outgoing of an e-mail.

As described above, the mobile telephone according to the embodiments captures a portrait image of a calling party, and then automatically registers the portrait image as the calling party's portrait image in the videophone call.

In the case in which an image file is attached to an e-mail received from an user whose portrait image is not registered in a telephone directory, a portrait image extracted from the image file attached may be registered automatically as a portrait image of the corresponding user. In the case in which an image file is not attached to an e-mail received from an user, text data extracted from a body of a message or a title of the e-mail received may be registered automatically in place of the user's portrait image.

Further, during battery-charging of the mobile telephone or at a predetermined time, such as 12:00 a.m. or 0:00 p.m., etc., it is determined whether or not a portrait image of each user stored in a telephone directory is registered. If the portrait image is not registered or a multiple portrait image setting is set, the user's calling record or text data extracted from an e-mail is automatically registered in place of the user's portrait image.

Thus, an automatic registration of portrait image of each user stored in the telephone directory becomes possible, thereby reducing a burdensome registration operation of the portrait image.

If multiple portrait images are registered, the corresponding user's portrait images are switched and displayed at a predetermined time interval when displaying the user's portrait image. Thus, all of the registered portrait images of the corresponding user can be displayed when displaying the user's portrait image.

Modified Embodiments

In the description of the above embodiments, the present invention is applied to a mobile telephone. Alternatively, the present invention also may be applied to any other portable device, such as a PHS phone, a PDA device, or a notebook-size personal computer, or the like, and is capable of providing the same or similar advantages as described above.

It should be understood by those skilled in the art that various modifications, combinations, subcombinations and alterations may occur depending on design requirements and other factors insofar as they are within the scope of the appended claims or the equivalents thereof.

The present document contains subject matter related to Japanese Patent Application No. 2006-158236 filed in the Japanese Patent Office on Jun. 7, 2006, the entire content of which are incorporated herein by reference.

What is claimed is:

1. An information processing device comprising:
a communication unit conducting a videophone call by sending and receiving sound and image data;
a memory storing a telephone directory which registers at least each individual telephone number and is capable of registering a portrait image associated with the individual telephone number;
a portrait image registration determination unit determining whether or not a portrait image of calling party is registered in the telephone directory by referring to the telephone directory based on a telephone number of calling party when outgoing or incoming of a call by the videophone function;
a portrait image capturing unit capturing a one-frame, still portrait image from a moving image received from a calling party as a calling party portrait image if the portrait image registration determination unit determines that the portrait image of the calling party is not registered in the telephone directory;
a portrait image automatic registration unit automatically registering in the memory the portrait image captured by the portrait image capturing unit as the calling party portrait image; a multiple portrait image registration setting unit providing multiple portrait image registration setting information indicating whether registration of multiple portrait images is allowed;
a multiple registration determination unit determining whether registration of multiple portrait images is allowed to the calling party based on the multiple portrait image registration setting information;
a display control unit outputting the registered multiple portrait images to a display unit while switching among the multiple portrait images at a predetermined interval when the telephone directory registers a plurality of portrait images of a calling party in the telephone directory, during a call-out process by the videophone function,
wherein, if the multiple registration determination unit determines that registration of multiple portrait images is allowed and if the portrait image registration determination unit determines that an additional one-frame, still portrait image from an additional moving image of the calling party is not registered, then the portrait image capturing unit captures the additional one-frame, still portrait image received from the calling party for registration of the additional one-frame, still portrait image so as to constitute registered multiple portrait images,
wherein the capturing unit captures the calling party portrait image at a lapse of a predetermined time from a start of call.

2. An information processing device having an e-mail function, comprising:
a memory storing a telephone directory which registers at least an e-mail address of an e-mail sender and is capable of registering a portrait image associated with the each e-mail address;

a portrait image registration determination unit operative to determine whether a portrait image received in the e-mail from the e-mail sender is registered;

a multiple registration setting determination unit operative to determine if multiple registration of multiple portrait images is permitted but only if the portrait image received from the e-mail sender is registered;

an attached image file locator unit operative to determine whether an attached image file is attached to the e-mail if either the portrait image received in the e-mail is not registered or the portrait image received in the e-mail is registered and multiple registration of multiple portrait images is permitted;

an image-file portrait extraction unit operative for extracting an image-file portrait image if the attached image file locator unit determines that the image-file portrait image is located and for registering the image-file portrait image as a portrait image of the e-mail sender if the image-file portrait image can be extracted;

a title determination unit operative, if the image-file portrait image cannot be extracted, to determine if a title to the e-mail can be found;

an extraneous character removal unit operative to remove extraneous characters from a title of the e-mail if the title can be found or from a body of a message contained in the e-mail if the title cannot be found, the extraneous characters constituting fixed phrases; and a text data extraction unit operative to extract text data from the title of the e-mail, if the title of the e-mail can be found, the extracted text data having a predetermined number of characters excluding the extraneous characters, and to register the extracted text data from the title having the predetermined number of characters as the portrait image of the e-mail sender and, if the title of the email cannot be found, remove extraneous characters from the body of the message of the e-mail constituting fixed phrases and extract text data from the body of the e-mail, the extracted text data having a predetermined number of characters excluding the extraneous characters, and register the extracted text data from the body of the e-mail having the predetermined number of characters as the portrait image of the e-mail sender.

3. An information processing device comprising:

an image portrait unregistering user detection unit detecting a user of which portrait image is not registered by referring to a telephone directory which registers at least telephone number, e-mail address of each user and a portrait image associated with the each user's telephone number and e-mail address when charging a device including the information processing device or when a current time equals to a predetermined time;

a calling date and time detection unit detecting a calling time and time corresponding to a user from a telephone call record memory storing a telephone call record, based on a telephone number of the user whose portrait image is detected as not registered in the image portrait unregistering user detection unit;

an e-mail detection unit detecting an e-mail corresponding to a user from an e-mail memory storing e-mail sent/received, based on the user's e-mail address if the calling date and time of user of which a portrait image is not registered is not detected in the calling date and time detection unit;

a portrait image capturing unit capturing a calling date and time as the portrait image of the user if the calling date and time detection unit detects the calling date and time, which corresponds to the user of which the portrait image is detected as not registered, and capturing, instead of the portrait image of the user, a title of the e-mail or text data in a body of the e-mail as the portrait image of the user if the e-mail detection unit detects the e-mail which corresponds to the user of which the portrait image is detected as not registered, the text data including a predetermined number of characters;

a portrait image automatic registration unit automatically registering in the memory the calling date and time or the text data captured in the capturing unit as the portrait image of user of which the portrait image is not registered.

* * * * *